United States Patent
Schick

(10) Patent No.: US 9,132,944 B2
(45) Date of Patent: Sep. 15, 2015

(54) SPOUT AND CONTAINER HAVING SUCH A SPOUT

(75) Inventor: Werner Schick, Neuenkirchen (DE)

(73) Assignee: Pöppelmann Holding GmbH & CO. KG, Lohne (DE)

(*) Notice: Subject to any disclaimer, the term of this patent is extended or adjusted under 35 U.S.C. 154(b) by 46 days.

(21) Appl. No.: 13/979,100

(22) PCT Filed: Dec. 1, 2011

(86) PCT No.: PCT/EP2011/006019
§ 371 (c)(1),
(2), (4) Date: Nov. 18, 2013

(87) PCT Pub. No.: WO2012/095127
PCT Pub. Date: Jul. 19, 2012

(65) Prior Publication Data
US 2014/0110433 A1 Apr. 24, 2014

(30) Foreign Application Priority Data

Jan. 11, 2011 (DE) .................. 20 2011 001 356 U

(51) Int. Cl.
B65D 35/38 (2006.01)
B65D 47/06 (2006.01)
B65D 75/58 (2006.01)

(52) U.S. Cl.
CPC ............ *B65D 47/06* (2013.01); *B65D 75/5883* (2013.01)

(58) Field of Classification Search
CPC .................................... B65D 75/5883
USPC ...................... 222/92, 107; 383/80
See application file for complete search history.

(56) References Cited

U.S. PATENT DOCUMENTS

| | | |
|---|---|---|
| D261,212 S | 10/1981 | Mills |
| 4,836,691 A * | 6/1989 | Suzuki et al. ................ 383/80 |
| 5,606,844 A * | 3/1997 | Takagaki et al. ............. 53/410 |
| 6,142,344 A | 11/2000 | Kai |
| 6,273,307 B1 | 8/2001 | Gross et al. |
| D489,978 S | 5/2004 | Brown |
| 6,958,033 B1 | 10/2005 | Malin |
| D566,547 S | 4/2008 | Lacov |
| D580,758 S | 11/2008 | Lacov |
| 7,850,044 B2 | 12/2010 | Hildebrand et al. |
| 2005/0040181 A1 | 2/2005 | Kurosawa et al. |
| 2007/0205202 A1* | 9/2007 | Hildebrand et al. ......... 220/613 |
| 2009/0285510 A1 | 11/2009 | Huang |

(Continued)

FOREIGN PATENT DOCUMENTS

| DE | 29509118 U1 | 9/1995 |
|---|---|---|
| DE | 60101766 T2 | 6/2004 |

(Continued)

*Primary Examiner* — Daniel R Shearer
(74) *Attorney, Agent, or Firm* — Husch Blackwell LLP; Daniel S. Cohn

(57) ABSTRACT

A spout, in particular weldspout, has a plastic body that forms a duct for filling or emptying a plastic pouch, the plastic body having lateral surfaces which are directed at least regionally away from one another, are provided with a surface structure, and merge into one another at two sides, wherein the lateral surfaces are configured for connecting to a plastic film, wherein the surface structure comprises at least one profile having a height of between 0.10 and 0.5 mm above a base surface of the lateral surface. Furthermore, the invention relates to a container comprising a film pouch and a spout connected to the latter.

11 Claims, 6 Drawing Sheets

(56) References Cited

U.S. PATENT DOCUMENTS

| | | | |
|---|---|---|---|
| 2010/0084436 A1 | 4/2010 | Arvizu | |
| 2011/0000798 A1 | 1/2011 | Ornath | |
| 2011/0062192 A1* | 3/2011 | Gruber | 222/566 |

FOREIGN PATENT DOCUMENTS

| | | |
|---|---|---|
| DE | 102005006871 A1 | 5/2006 |
| DE | 202006013587 U1 | 3/2008 |
| EP | 1182144 A1 | 1/2004 |
| EP | 1449784 A1 | 8/2004 |
| EP | 1433716 B1 | 9/2005 |
| EP | 1655233 A1 | 5/2006 |
| EP | 1980498 A1 | 10/2008 |
| EP | 1897815 A3 | 6/2011 |
| FR | 2224364 A1 | 10/1974 |
| JP | 2001240083 A | 9/2001 |
| JP | 2004155493 A | 6/2004 |
| JP | 2006232295 A | 9/2006 |
| WO | 9845190 A1 | 10/1998 |
| WO | 2005066037 A1 | 7/2005 |
| WO | 2005108228 A1 | 11/2005 |
| WO | 2009094215 A2 | 7/2009 |

* cited by examiner

SPOUT AND CONTAINER HAVING SUCH A SPOUT

CROSS REFERENCE

This application claims priority to PCT Application No. PCT/EP2011/006019 filed 1 Dec. 2011, which in turn claims priority to German Patent Application No. 20 2011 001 356.1, filed 11 Jan. 2011, both of which are expressly incorporated in their entirety by reference herein.

The present invention relates to a spout, in particular a weldspout, having a plastic body that forms a duct for filling or emptying a plastics pouch, said plastic body having lateral surfaces which are directed at least regionally away from one another, are provided with a surface structure and merge into one another at two sides, wherein the lateral surfaces are configured for connecting to a plastic film. Furthermore, the invention relates to a container comprising a film pouch and such a spout.

From the prior art, it is known to weld the lateral surfaces of a part, also known as a boat, of a weldspout to a film pouch. In order to form an optimal connection between the spout and the film pouch, the lateral surfaces of the boat of the spout were provided in the prior art with a surface structure having a particular roughness (EP 1 701 892 B1). However, a disadvantage with this type of surface structure of the lateral surfaces of the boat is the possible formation of air pockets or hollow channels which extend in the longitudinal direction of the duct and can result in a lack of sealing of a pouch having a film pouch and a spout welded to the latter. Furthermore, it has been shown that the connection between the surface and the film pouch can be damaged by excessive shear forces during the filling of relatively large pouches.

It is therefore the object of the present invention to develop a spout for a container and also an associated container in an improved manner with regard to its load-bearing capacity and its sealing.

According to the invention, it is provided that the surface structure has a profile having a height of 0.1 mm to 0.5 mm above a base surface of the lateral surface. On account of the use of such a surface structure, after a welding-in operation, more parts of the film welded to the lateral surface are in an angled position with respect to the main direction of pull, this resulting in an improvement in the load-bearing capacity in particular in the case of surface structures having rounded or other non-sharp edges. A main direction of pull is generally a direction parallel to a longitudinal centre axis of the duct. The base surface is in this case determined by a surface which—as seen in each case perpendicularly to the lateral surface leads through the lowest region(s)/point(s) of the lateral surface and otherwise extends parallel to unstructured regions of the lateral surface. In the case of a smooth lateral surface, the base surface would be defined by the lateral surface itself and there would be no elevated profile, "Height" is to be understood in this case as meaning the distance of a surface leading through the highest point of the profile and extending parallel to the base surface. This is thus the maximum height of the profile, which, in the case of a profile which is wave-shaped in section, is formed for example by the highest point on the wave crest. Large parts of the surface structure can thus also have a lower height.

Advantageously, in the case of a section at half the maximum height of the profile, between 30% and 60% of the surface structure are located in the section. The profile thus has peaks and troughs/intermediate spaces. At such a value, the heat introduced into the points of the profile during a welding-in operation can not only be transmitted readily but can also bring about the liquefaction of the highest regions of the profile, which are then able to flow into the intermediate spaces. This in turn also results in a firm connection, since the liquefied plastic material produces a good connection with the film to be welded on and the plastic body.

Advantageously, at least 10% of the surface of the lateral surface has a structure according to the invention, and so the shear forces required for tearing off the weldspout from the film pouch have already risen significantly. Accordingly, projected onto the base surface, more than 10% of the base surface is covered by the surface structure. A projection is understood in this case to mean a projection along a vertical to the base surface. The surface structures are rounded, in particular as seen transversely to a longitudinal extent, and may in particular be crosspiece-like structures. Advantageously, the height of the profile is between 0.1 mm and 0.3 mm, particularly preferably between 0.12 mm and 0.2 mm. These heights are particularly advantageous at the film thicknesses of 0.05 mm to 0.5 mm which are typically used, since an optimum with regard to the tearing strength has resulted in this case during the welding-in tests carried out.

Preferably, the profile thus has regions remote from an underside of the spout, said underside as a rule representing a surface formed transversely to the longitudinal axis of the duct, i.e. has protrusions or overhangs with regard to the underside.

A uniform introduction of force into the spout is brought about in particular by a profile formed by at least one longitudinal ridge and/or longitudinal furrow. Preferably, such a longitudinal ridge or longitudinal furrow begins or ends in each case in the region of a lateral lug, wherein a lug is understood to be a non-hollow lateral portion which is formed by the lateral surfaces merging laterally into one another. In addition to a defined introduction of force, the formation of vertically extending air pockets or vertically extending channels is effectively prevented by such a transverse extent along an underside from one side of a spout to the other. The container according to the invention is thus additionally sealed.

It has also been shown that, when profiles having longitudinal ridges and/or longitudinal furrows are formed along the lateral surface, said profiles being deflected multiple times, i.e. having for example profiles which go from a left-hand curve into a right-hand curve and back into a left-hand curve, the formation of air pockets resulting in a lack of sealing is additionally effectively hindered. This applies in particular for longitudinal ridges or furrows extending from one side, for example a left-hand lug to a right-hand lug. On account of the multiple deflections, even partially curved air pockets cannot result in a lack of sealing.

In particular, the longitudinal ridges or longitudinal furrows can extend in a zigzag- or wave-shaped manner from one lug to the other lug, wherein, in the case of a for example sawtooth-like formation of a longitudinal ridge, the pointed deflection regions can still have a radius of curvature which corresponds at least to the film thickness. Preferably, the radius of curvature is at least more than 0.05 mm, in order not to form any points that are directed in a direction opposite to the main loading direction of the film-spout connection and which can damage the film structure in the event of loading.

Further protection against the formation of a lack of sealing is achieved by a configuration according to the invention of a spout which has a profile section which is at least partially adjacent to a further profile section as seen in the longitudinal direction and partially overlaps or covers said further profile section as seen in the transverse direction and along the lateral surface. A transverse direction means in this case a direction transversely, i.e. in particular vertically, with respect to a longitudinal centre axis of the duct, and a longitudinal direction means a direction longitudinally with respect to a longitudinal axis of the duct.

Thus, the lateral surfaces can have profiles provided for example with spiral-shaped or L- or C-shaped sections located alongside one another.

Preferably, a spout according to the invention is furthermore provided with a plurality of longitudinal ridges or longitudinal furrows which are arranged alongside one another, extend transversely over the entire lateral surface at the above-defined height and preferably all begin on one side in the region of a lug and end on the other side. Particularly on account of the use of waves, i.e. for example sinusoidally formed profile ridges which are located close together and which, even in a direction parallel to a longitudinal centre axis of the duct, do not form sharp edges but rather soft and gentle transitions, the sealing and bearing capacity of the connection of a spout according to the invention to a film pouch is increased.

In order to bring about good integration in the lateral regions, i.e. in particular in the region of the lugs, the profiles can end in the region of the lugs, i.e. even have heights of less than 0.1 mm.

As an alternative or in addition to a plurality of waves and/or other predominantly transversely extending profiles formed continuously from one lug to the other, such lugs can also border a plurality of depressions, or bordered regions, into which a film of a film pouch is pressed or pulled in a fastening operation.

On account of the increase in the bearing capacity of a container according to the invention, a lower outer edge of the plastic body, in particular of the boat, can represent a weak point in the sense of a predetermined tearing line. It is therefore advantageous to provide this edge with an on average smaller curvature than an upper outer edge of the plastic body. As an alternative or in addition, the lower outer edge of the boat can have less curvature than a lower inner edge of the boat, with the edges of the side walls that form the boat being meant in this case. Preferably, the curvature of the lower outer edge of the side wall of the boat increases towards the sides, for example in the direction of any lugs. The curvature of the upper edge corresponds to that of an edge usually used in spouts.

It is easier to match the surface structure to the film to be fastened to the spout if the radius of curvature of one or the lower outer edge corresponds at least to the height of the profile. The profile and edge can then have similar curvatures which do not damage the integrity of the material of a film pouch to be fastened to the spout.

The advantages described above and below can also apply to a container according to the invention which has a film pouch comprising a spout connected to the latter, wherein the spout is configured as described above or below.

By way of a welding operation, the height of the profile can be partially reduced but will not necessarily completely disappear, such that a certain structuring in the region of the weld seam can be seen even in the case of welding of the film pouch. On account of the resulting deflection of the film, the loading capacity of the connection, with the film intact, is improved.

Further advantages and details of the invention can be gathered from the following description of the figures. In the schematic illustrations of the figures.

Identically or similarly acting parts are—where convenient—provided with identical reference signs. Individual technical features of the exemplary embodiments described below can also result in developments according to the invention with the features of the previously described exemplary embodiments.

Figure 1:
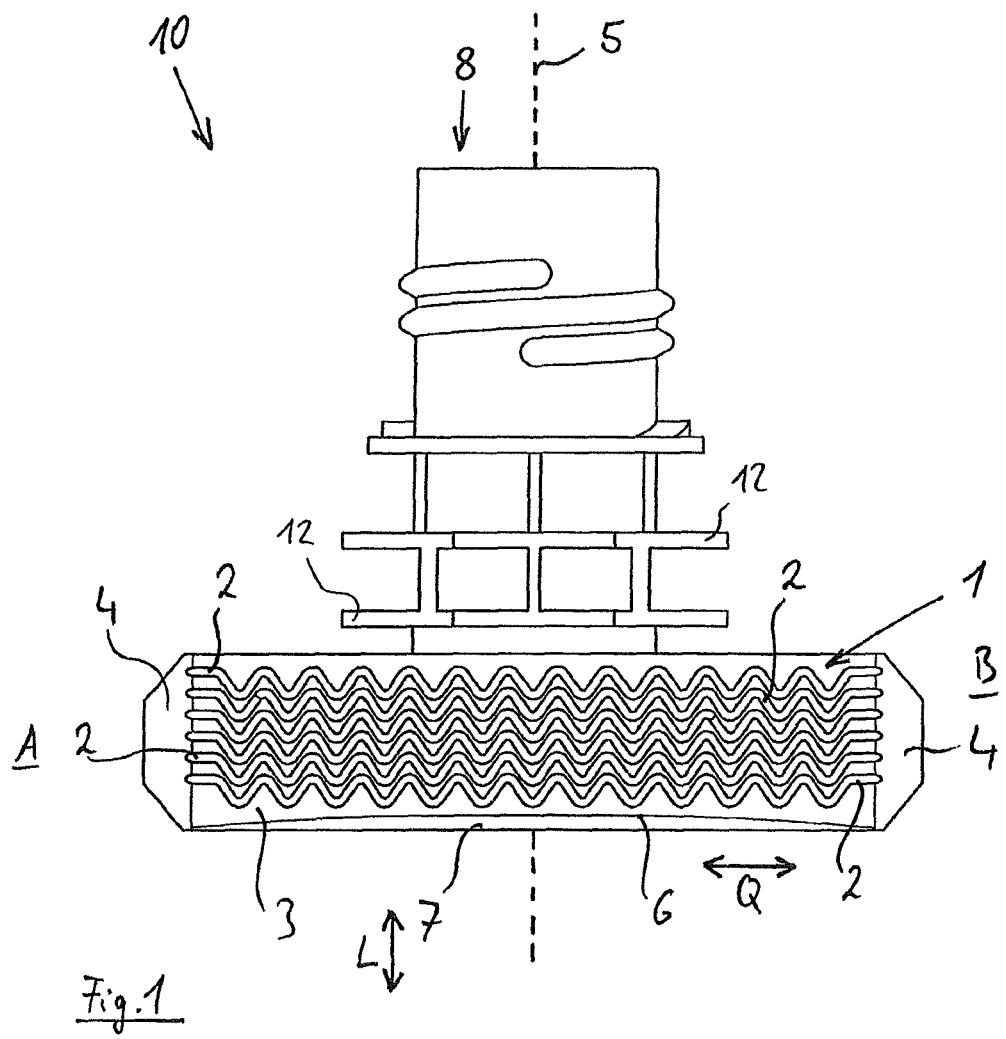
FIG. 1 shows a side view of an article according to the invention.
Figure 2:
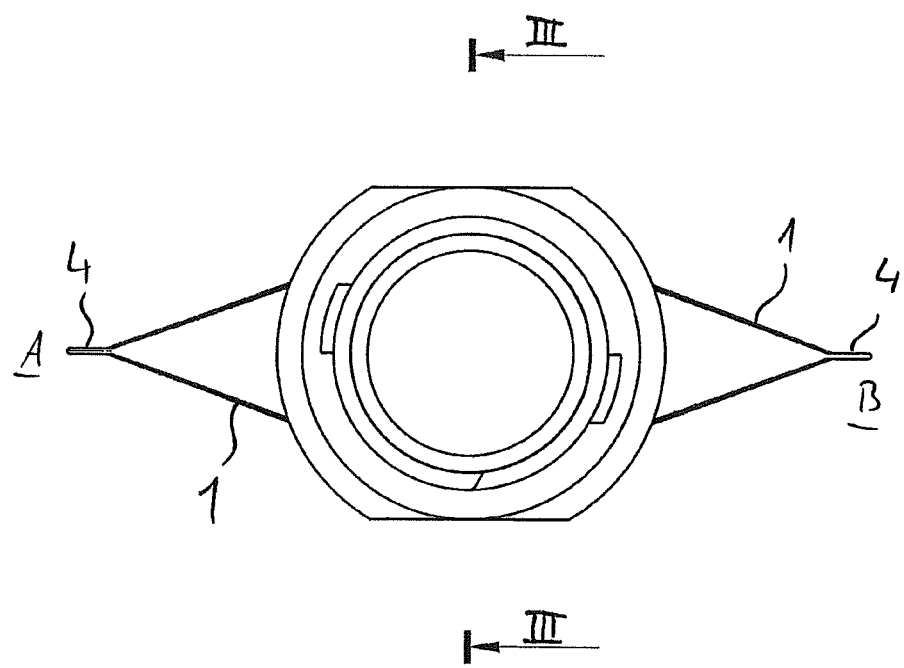
FIG. 2 shows a plan view of the article according to FIG. 1.

A spout according to the invention, which is in the form of a weldspout, has, according to FIG. 2, a lateral surface 1 which has a profile formed by a total of six waved lines 2. The waved lines 2 are raised, as longitudinal ridges, from a surface 3 which forms the base surface of the lateral surface 1. The height of the central crests of the longitudinal ridges above the base surface is 0.15 mm. The longitudinal ridges begin and end in each case in the region of lateral lugs 4 which simultaneously form a transition region between the lateral surface shown in FIG. 1 and the rear lateral surface (not illustrated). The left-hand side in the figure represents a side A, while the right-hand side in the figure is designated B.

On account of the multiple deflections of the approximately sinusoidal longitudinal ridges and the transverse extent thereof from side A to side B, the formation of air pockets extending in the direction of a longitudinal centre axis 5 of a duct is effectively prevented.

A contour edge 6 indicates, as seen in the direction of the axis 5, the start of a curvature of the lower outer edge 7 of the lateral surface. Said curvature ends at the lugs 4 and thus at the sides A, B of the lateral surfaces.

As can be seen in the plan view according to FIG. 2, the lateral surfaces 1 are directed away from one another and constructed in a symmetrical manner.

Both in the longitudinal direction L and in the transverse direction Q, i.e. as seen vertically with respect to the longitudinal centre axis 5, the individual longitudinal ridges intersect or overlap one another as seen along the base surface 3. On account of the curved configuration, forces both in the direction of the vertical longitudinal centre axis and transversely thereto can be absorbed easily. The pouch is therefore formed in a particularly secure and sealed manner.

Figure 3:
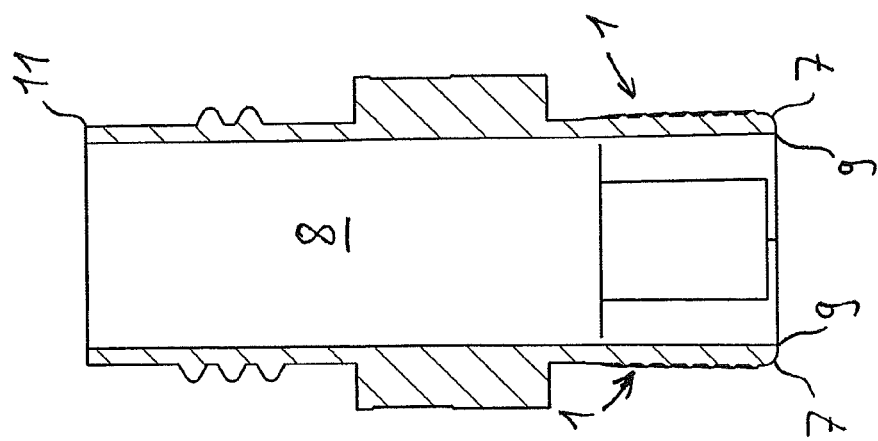
FIG. 3 shows the article according to FIG. 2 along the section III-III.
Figure 4:
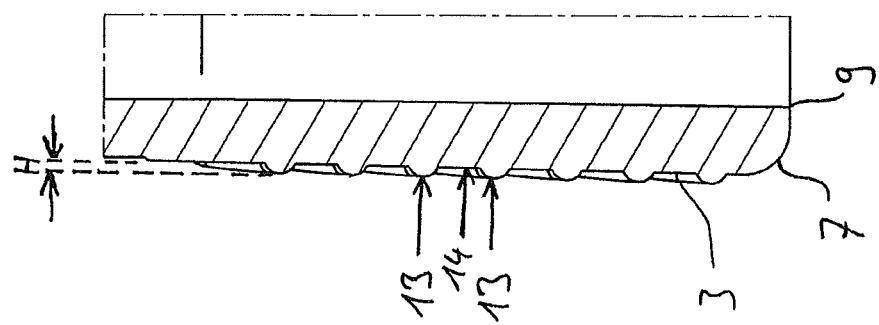
FIG. 4 shows a detail of the left-hand lower part of the article according to FIG. 3.

As can be seen in FIG. 3, the two edges 7 at the bottom on the outside of the lateral surfaces 1 are formed in a less sharp manner than the edges 9 bounding an internal duct 8 through which a film pouch can be filled or emptied (cf. also FIG. 4). The same goes for the upper outer edge 11 of the plastic body. Furthermore, FIG. 4 shows the definition of the height H of a longitudinal ridge formed in particular in a rounded manner above the base surface 3.

The wave-shaped longitudinal ridges 2 cover, projected onto the base surface 3, more than 10% of the base surface 3. In FIG. 4, in the present case around 30% of the base surface is covered by the surface structure. Thus, points 13 of the wave-shaped longitudinal ridges that melt during a welding-in operation flow at least partially into the troughs 14 located between the longitudinal ridges, the base of said troughs 14 being formed by the base surface. If the troughs 14 were to be formed in a narrower manner, more longitudinal ridges could be formed on the boat and more than 30% of the structure would be located in the section at half the height of the (maximum) height.

Figure 5:
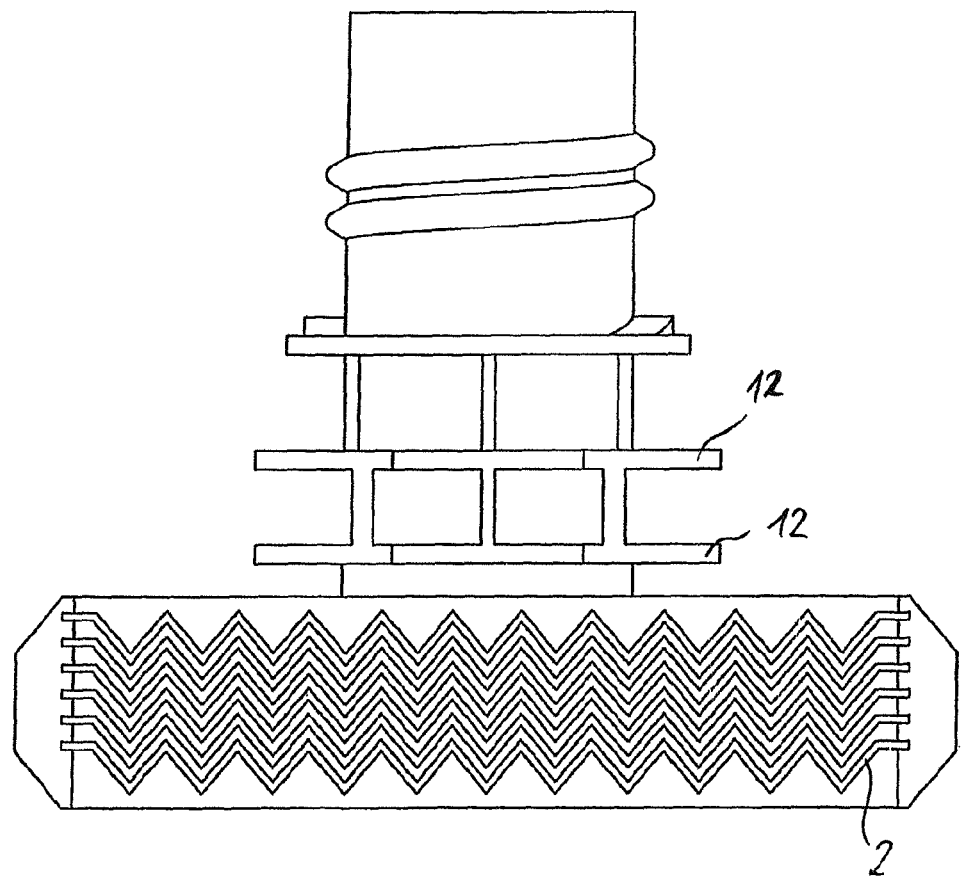
FIG. 5 shows a further article according to the invention.
Figure 6:
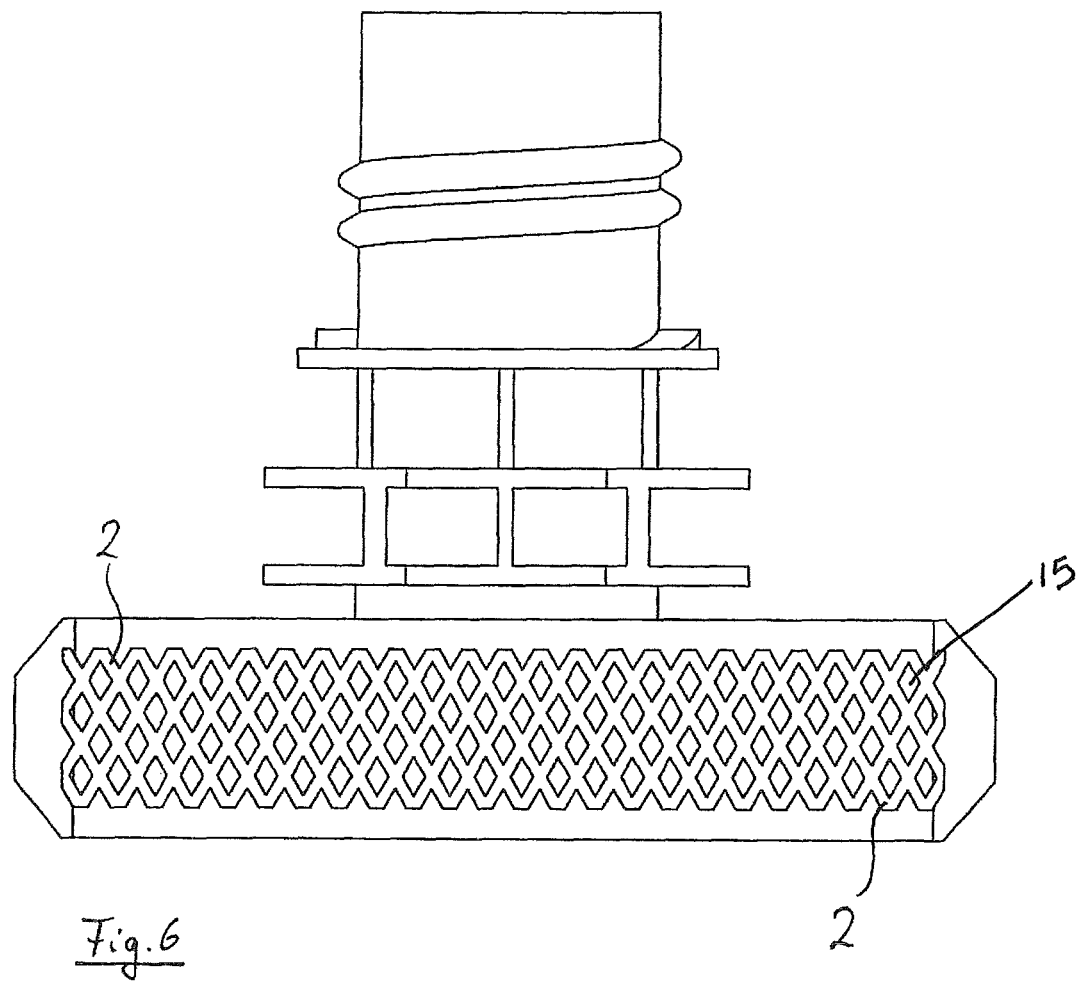
FIG. 6 shows a further article according to the invention.

Further exemplary embodiments according to the invention are shown in FIGS. 5 and 6, the longitudinal ridges 2 of said further exemplary embodiments likewise having a multiplicity of deflections and ending in the region of the lugs. FIG. 6 furthermore shows bordered regions 15. Particularly the surface structures of the exemplary embodiments according to FIGS. 1 and 5 are highly suitable for spouts which have guide grooves formed by crosspieces 12. On account of the bearing capacity, improved according to the invention, of the connection of the spout and film pouch, the already filled containers held by way of the crosspieces can be both transported more quickly and filled more quickly and with larger quantities and as a whole more securely.

The invention claimed is:

1. A spout, in particular a weldspout, comprising:
 a plastics body that forms a duct for filling or emptying a plastics pouch;
 said plastics body having lateral surfaces which are directed at least regionally away from one another, are each provided with a surface structure, and merge into one another at two sides;
 wherein the lateral surfaces are configured for connecting to a plastics film;
 wherein the surface structure comprises at least one profile having a height of between 0.10 and 0.5 mm above a base surface of the lateral surface, said profile being formed by at least one of a plurality of longitudinal wavy ridges and a plurality of furrows, which are arranged alongside one another, wherein said at least one of said plurality of longitudinal wavy ridges and furrows undergo multiple deflections as seen along the lateral surface;
 wherein none of said ate least one of said plurality of longitudinal wavy ridges and plurality of furrows intersect.

2. The spout according to claim 1, characterized in that the longitudinal ridge or longitudinal furrow begins or ends in each case in the region of a lateral lug.

3. The spout according to claim 1, wherein said profile further comprises at least first and second profile sections that are at least partially adjacent to one another as seen in the longitudinal direction; and
 wherein said first profile section at least partially overlaps said second profile section as seen in the transverse direction and along the lateral surface.

4. The spout according to claim 1, characterized in that a lower outer edge of at least one of the lateral surfaces has a smaller curvature than an upper outer edge of the plastics body.

5. The spout according to claim 4, characterized in that the lower outer edge of at least one of the lateral surfaces has a smaller curvature than a lower inner edge of the plastics body.

6. The spout according to claim 1, characterized in that a lower outer edge of at least one of the lateral surfaces has a curvature that increases towards the sides.

7. The spout according to claim 1, characterized in that a lower outer edge of the lateral surface is provided with the radius of curvature that corresponds at least to the height of the profile.

8. The spout according to claim 1, characterized in that the profile ends in lugs on the lateral surfaces.

9. The spout according to claim 1, characterized in that, projected onto the base surface, more than 10% of the base surface is covered by the surface structure.

10. A container comprising:
 a film pouch; and
 a spout connected to the film pouch, the spout further comprising:
 a plastic body that forms a duct for filling or emptying a pouch;
 said plastic body having lateral surfaces which are directed at least regionally away from one another, are each provided with a surface structure and merge into one another at two sides;
 wherein the lateral surfaces are configured for connecting to a film;
 wherein the surface structure comprises at least one profile having a height of between 0.10 and 0.5 mm above a base surface of the lateral surface, said profile being formed by at least one of a plurality of longitudinal wavy ridges and a plurality of furrows which are arranged alongside one another, wherein said at least one of said plurality of longitudinal wavy ridges and furrows undergo multiple deflections as seen along the lateral surface;
 wherein none of said ate least one of said plurality of longitudinal wavy ridges and plurality of furrows intersect.

11. The container according to claim 10, characterized in that the height of the profile is reduced during welding of said film pouch to the spout.

* * * * *